UNITED STATES PATENT OFFICE.

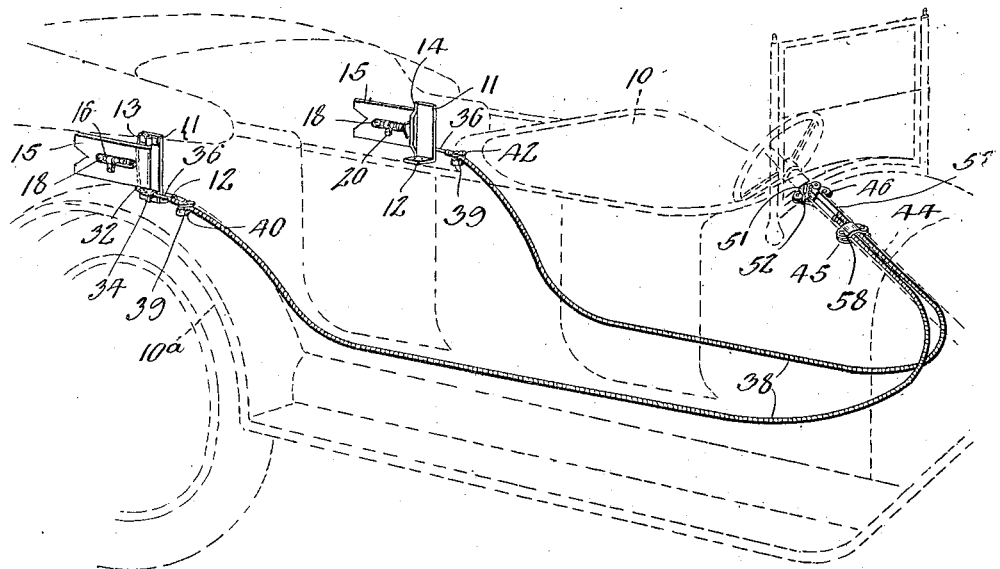
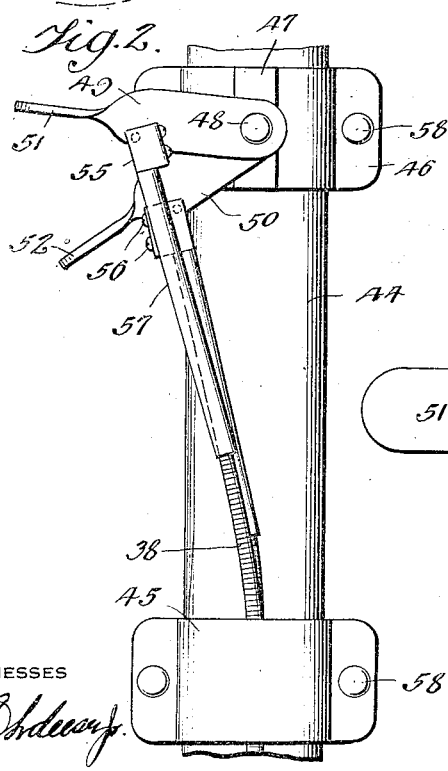
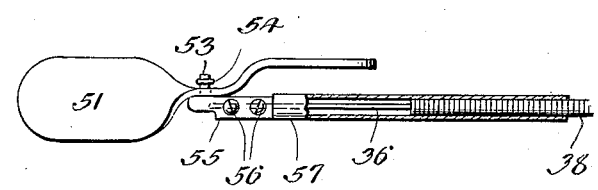

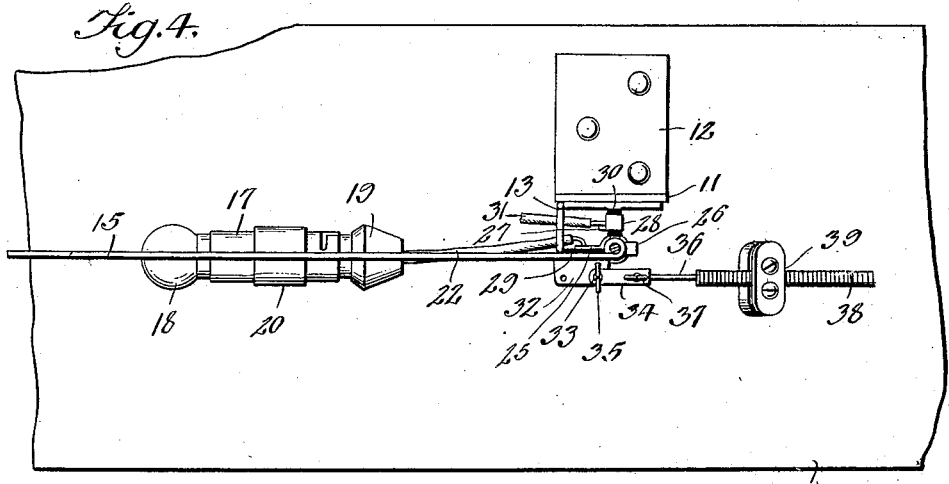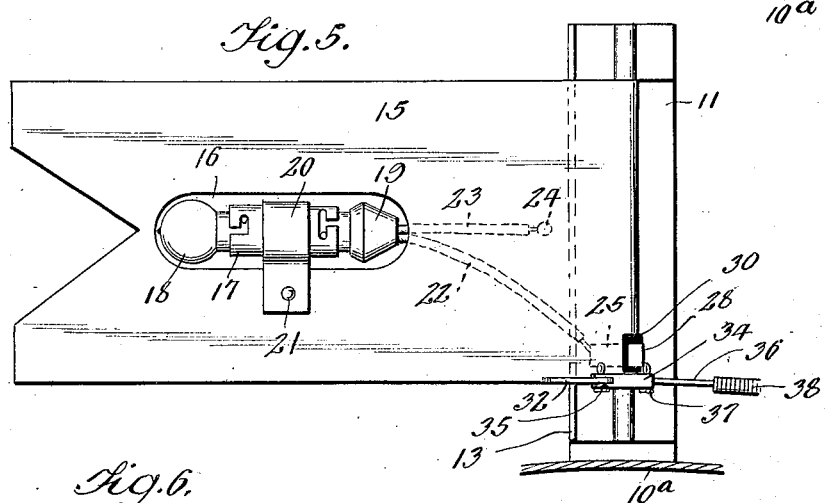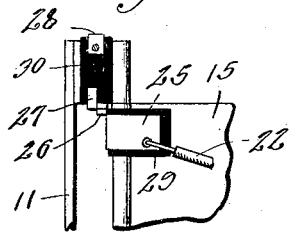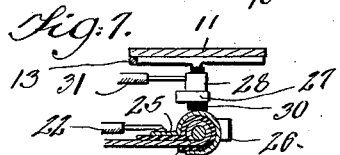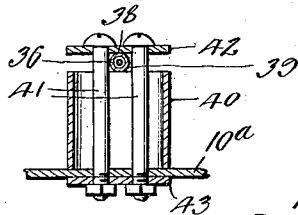

EMIL ZIEGENBALG, OF SAN ANTONIO, TEXAS.

AUTOMOBILE-SIGNAL.

1,369,597.  Specification of Letters Patent.  Patented Feb. 22, 1921.

Application filed August 7, 1917. Serial No. 184,912.

*To all whom it may concern:*

Be it known that I, EMIL ZIEGENBALG, a citizen of the United States, residing at San Antonio, in the county of Bexar and State of Texas, have invented new and useful Improvements in Automobile - Signals, of which the following is a specification.

This invention is a signal more particularly adapted for use upon vehicles of the self propelled variety.

The increasing difficulty attending the operation of a vehicle under modern traffic conditions requires signals to be promptly given for the direction to be taken when a change is made. Such directions should be unmistakable, both to the traffic officer and the following driver, and they should be operated in such manner that due warning will be given of the intentions of the driver of a leading vehicle. They should furthermore be simple in construction, performing their functions quickly and readily, and they should be so positioned upon the vehicle that the signals given should be visible from the front and rear simultaneously.

To conform to the simple requirements of a direction signal, the invention has for its primary object to provide a signal that may be quickly and readily operated by the driver with positive knowledge that the signal will be shown both front and rear and also to provide a simply operated and strongly constructed signal that will meet the desired requirements.

The invention, broadly stated, comprises a semaphore blade hingedly connected to the vehicle, the blade being provided with an opening in which is disposed an electric lamp, means to move the blade to a plurality of positions, said means including levers preferably mounted upon the steering post, a switch to open and close the circuit to the lamp upon the semaphore blade, and operated by the movement of the blade, one part of said switching mechanism being carried by the vehicle, and circuits therefor including a source of electric energy.

One practical form of construction will be described and illustrated in the accompanying drawings, in which:—

Figure 1 is a diagrammatic view in perspective of the signal and its operating parts upon a vehicle which is shown in dotted lines.

Fig. 2 is a side elevation of a portion of a steering post with the operating levers thereon.

Fig. 3 is a top plan view of an operating lever and its connected parts.

Fig. 4 is a top plan view of the movable blade and its immediate connections mounted on the fender.

Fig. 5 is a side elevation of the blade and its attachment to the vehicle.

Fig. 6 is a perspective detail view of the switching device and its companion parts.

Fig. 7 is a detail sectional view of the switch device.

Fig. 8 is a detail sectional view of the cable holding attachment.

In the preferred embodiment shown, the body of the vehicle is indicated at 10, and secured thereto upon each rear fender thereof are two angle members forming hinges, indicated at 11 and having the bases 12. These members may be of any usual or convenient form and are provided with the stop members indicated at 13 and 14. These stop members are preferably secured to each of the members to act as stops or rests for the semaphore blade indicated at 15.

The semaphore blade 15 may be of any usual type of construction that will enable it to be hingedly connected with the members 11, and as shown is provided with an aperture 16 formed centrally of the blade and an arrow-like cut-away portion at its free end.

Disposed within the aperture 16 is a socket 17 whose two ends are adapted to engage with a lamp 18 and a plug connection 19. This socket 17 is preferably of a two-point Edi-Swan type, which is in common use upon self-propelled vehicles provided with electric lights.

The socket 17 and its connecting parts are maintained in the recess or aperture 16 by means of a strap connection 20 that is bolted to the semaphore blade 15 by the bolt and nut indicated at 21. This strap encircling the socket 17 is adapted to clamp the socket and firmly hold it in its proper position within the aperture 16. The type of connection shown will permit of connection and disconnection in the usual and customary manner for replacement or for breaking the circuit as may be required.

Two wires indicated at 22 and 23 are connected to the plug 19, and the wire 23 is preferably soldered to the semaphore blade as indicated at 24. The conductor wire 22 is connected to a terminal, indicated by the flat plate 25, and said plate has a bent portion to encircle the hinged connection of the blade 15. The plate 25 is formed of conducting material and is provided with a contact indicated at 26. The contact 26 is adapted to engage with a stationary contact 27, which is carried by the conducting plate indicated at 28.

As shown, the plate 28 encircles the projecting portion of the hinge 11. To insulate the plate 25 from the semaphore blade, suitable insulating means indicated at 29 are employed, and to insulate the conducting plate 28 from the hinge, the insulating material 30 is employed. To the plate 28 is connected one of the terminal wires indicated at 31. Thus the circuit will be seen to have one side grounded while the other side of the circuit enters by means of the terminal wire 31 to the plate 28, thence to the contact 27.

When the blade is swung outward, the contact 26 engages with the contact 27 and completes the circuit by means of the plate 25, the conductor wire 22, the plug 19, thence to the lamp 18, back through the conductor wire 23 to the soldered connection 24 on the blade 15. The swinging movement of the blade 15 will complete the circuit and the lamp 18 will be lit. When the blade rests against the side of the vehicle 10 the lamp will be disconnected, and therefore unlit.

As shown, the blade 15 is provided with a projecting lip or lug indicated at 32, and this lug is provided with holes, one of which is indicated at 33. Another hole is formed in the opposite end which is adapted to engage with a formed member indicated at 34, and this formed member is pinned to the lug 32 at the point indicated at 35, so as to provide a hinged connection therewith. The formed member 34 is provided with a suitable hole so that it may engage with the operating wire 36. This wire 36 is connected to the forked member at 37.

The operating wire 36 is adapted to ride in an armored tube, indicated at 38, which operating wire and tube may be of the type known as the Bowden wire. This type of wire is universally used for this class of movement.

As shown, the tube 38 is connected to the side of the automobile 10 at the point indicated at 39. This may consist of the tube member 40 through which the bolts 41 pass. Under the heads of the bolts is a plate 42 which firmly holds the tube 38. These bolts 41 pass through suitable holes in the fenders 10ª and are held by the usual nuts. A reinforcing plate 43 may be employed.

The steering post for the vehicle is indicated at 44, and mounted upon this steering post is a clamp 45 which may be of any usual type or construction and is adapted to clamp the armored tube 38 of the Bowden wire so as to firmly hold it against movement. Secured at a convenient point upon the post 44 is another clamp having its top side, indicated at 46, formed with a channeled portion 47 so as to space this portion away from the post to provide for a pivotal connection 48 for the operating levers 49 and 50. These operating levers are provided with flat portions so as to ride upon the channeled portion 47 and in substantially firm engagement therewith, and are provided with bent portions terminating in the handles 51 and 52. The handles are preferably bent and turned so that the edge of the handle lies within the same parallel plane as that of the pivot 48. In other words, the handles 51 and 52 are turned through 90° with reference to the flat portions of the levers.

The flat portions of the levers are provided with suitable holes to engage with pins. In Fig. 3 one of these pins is indicated at 53, and is provided with a transverse hole that is adapted to receive a cotter pin 54. The pin 53 is carried on a shank 55 that is provided with an aperture that passes longitudinally therethrough, and through this aperture passes the other end of the operating wire 36. This wire 36 is adapted to be secured in firm engagement in its hole by means of the binding screws indicated at 56.

Suitably connected to the shank 55 is a sleeve 57, which is preferably cylindrical, and is adapted to engage and receive one end of the armored portion 38 of the Bowden wire. This sleeve serves to move the operating wire 36 in a straight line direction, and also prevents bending of the armored portion at its end.

To hold the clamps 45 and 46 in their proper positions on the steering post 44, suitable holding means are employed, as indicated by the bolts 58.

In practical operation, when the several parts are assembled in their proper relations upon the steering post and upon the side of the vehicle, and a suitable source of electric energy is connected so that the terminals leading to the lamp 18 are properly made, and it is desired to signal to a following vehicle, one of the levers 51 is moved, which communicates its motion to the shank 55, the sleeve 57 and the operating wire 36. As the operating wire 36 passes through the armored tube 38, its motion is directed to the forked member 34, and thus tends to move the semaphore blade 15 to one of several positions.

As the blade 15 is supposed to rest against the side of the vehicle so as not to be seen, this movement of the operating lever tends to move the blade from its state of rest to a position which is substantially at right angles to the body of the vehicle. As the blade 15 moves outwardly the contacts 26 and 27 engage, and complete the circuit to the lamp 18. After the circuit is completed, the lamp will be lit and thus a visible signal will be given that may be seen at night. As long as the blade 15 projects outwardly, the lamp will be lit, and by a movement of the operating lever the blade will be moved back to its position of rest or inoperativeness, which movement also causes the contacts 26 and 27 to separate, thus breaking the circuit to the lamp.

From the description and illustrations, it will be seen that the device is of a very simple character, and readily operated in a positive manner, so that it may give an effective warning to a following vehicle.

Minor changes in the form, proportions, and details of construction may be resorted to without departing from the spirit of the invention or the scope of the appended claim.

What is claimed as new is:—

In a device of the class described, the combination with an upright, of a vertical rod secured to the upright, a blade having its rear end portion rolled about said rod and adapted for movement about a vertical axis, said blade being provided with an opening, a lamp arranged in said opening, a contact plate formed from flat metal having one end portion rolled about the rolled end portion of said blade and provided with a laterally extending contact head, an insulating strip disposed between said contact plate and the adjacent portion of said blade, a stationary contact carried by said upright and disposed in the path of travel of the head of said contact plate, means establishing electrical connection between said lamp and said contact plate, and operating means for said blade.

In testimony whereof I affix my signature.

EMIL ZIEGENBALG.